(12) United States Patent
Kim

(10) Patent No.: US 8,433,378 B2
(45) Date of Patent: Apr. 30, 2013

(54) AUDIO DRIVER HOUSING WITH EXPANDABLE CHAMBER FOR PORTABLE COMMUNICATION DEVICES

(75) Inventor: David K. J. Kim, Mission Viejo, CA (US)

(73) Assignee: KYOCERA Corporation, Kyoto (JP)

( * ) Notice: Subject to any disclaimer, the term of this patent is extended or adjusted under 35 U.S.C. 154(b) by 586 days.

(21) Appl. No.: 12/388,992

(22) Filed: Feb. 19, 2009

(65) Prior Publication Data

US 2010/0210327 A1     Aug. 19, 2010

(51) Int. Cl.
*H04B 1/38* (2006.01)
*H04R 1/02* (2006.01)

(52) U.S. Cl.
USPC ................... 455/575.3; 455/575.1

(58) Field of Classification Search .............. 455/550.1, 455/574.4, 575.3, 575.1, 575, 90; 381/104, 381/106, 110, 337, 345, 182, 383, 351, 300, 381/386

See application file for complete search history.

(56) References Cited

U.S. PATENT DOCUMENTS

| | | | |
|---|---|---|---|
| 4,164,988 A | | 8/1979 | Virva |
| 5,418,338 A | | 5/1995 | Kim |
| 5,883,966 A | * | 3/1999 | Kubo ............................ 381/386 |
| 6,292,573 B1 | | 9/2001 | Zurek et al. |
| 6,367,579 B1 | * | 4/2002 | Wiener .......................... 181/199 |
| 7,242,785 B2 | * | 7/2007 | McNary ......................... 381/182 |
| 2005/0049018 A1 | * | 3/2005 | Chiang et al. .............. 455/575.1 |
| 2006/0272885 A1 | | 12/2006 | Lee |
| 2007/0029131 A1 | | 2/2007 | Pan et al. |
| 2007/0142100 A1 | * | 6/2007 | Lee ............................ 455/575.3 |
| 2007/0253153 A1 | | 11/2007 | Kwong et al. |

FOREIGN PATENT DOCUMENTS

| GB | 2 319 417 | 5/1998 |
|---|---|---|
| WO | WO 2006/011219 | 2/2006 |

* cited by examiner

*Primary Examiner* — Crystal L Hammond

(57) ABSTRACT

A portable communication device includes an audio driver movable within an audio driver housing which forms an expandable chamber. The portable communication device includes at least two portions that are moveably connected to each other allowing the device to be in at least a closed position and an open position. The audio driver can be maintained in a compressed position when the portable communication device is in an open position. Accordingly, the volume of the chamber is independent of the relative position between the portions forming the portable communication device.

19 Claims, 5 Drawing Sheets

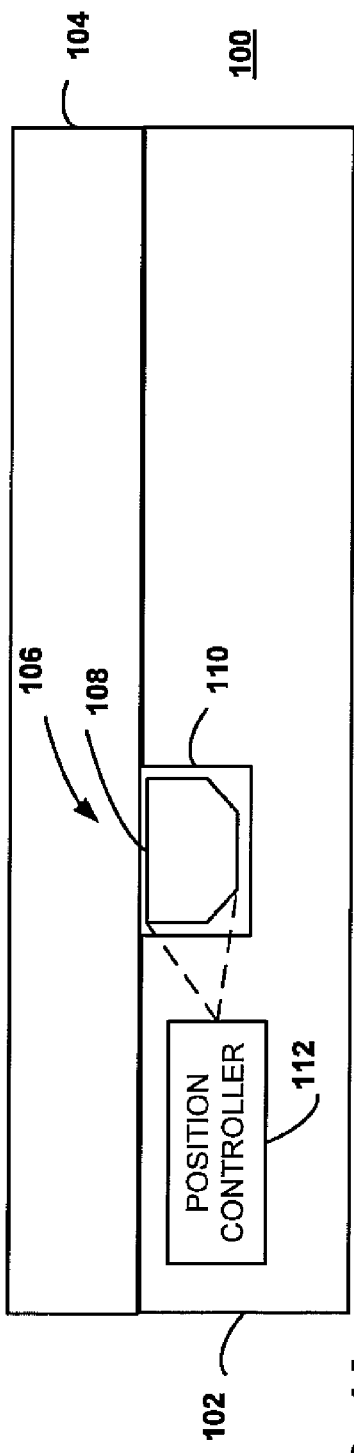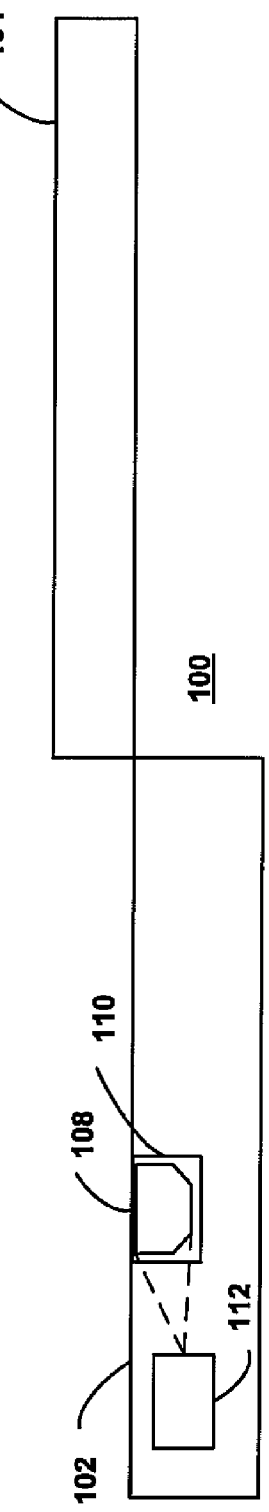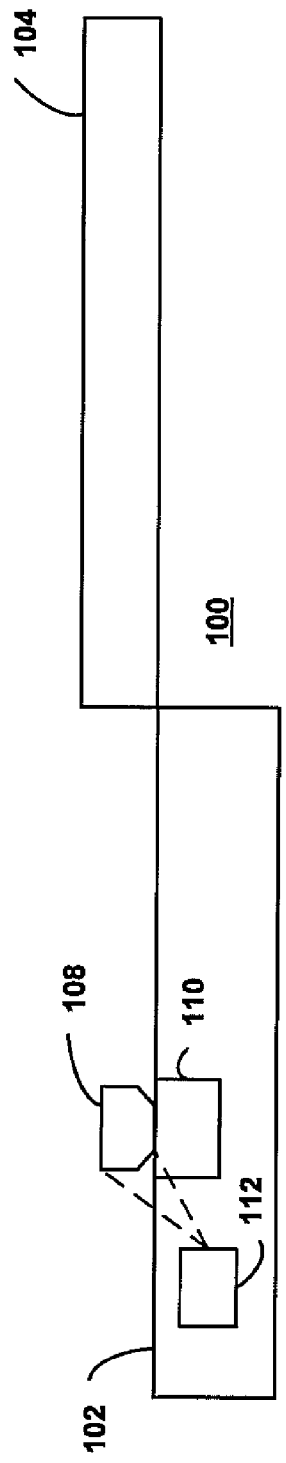

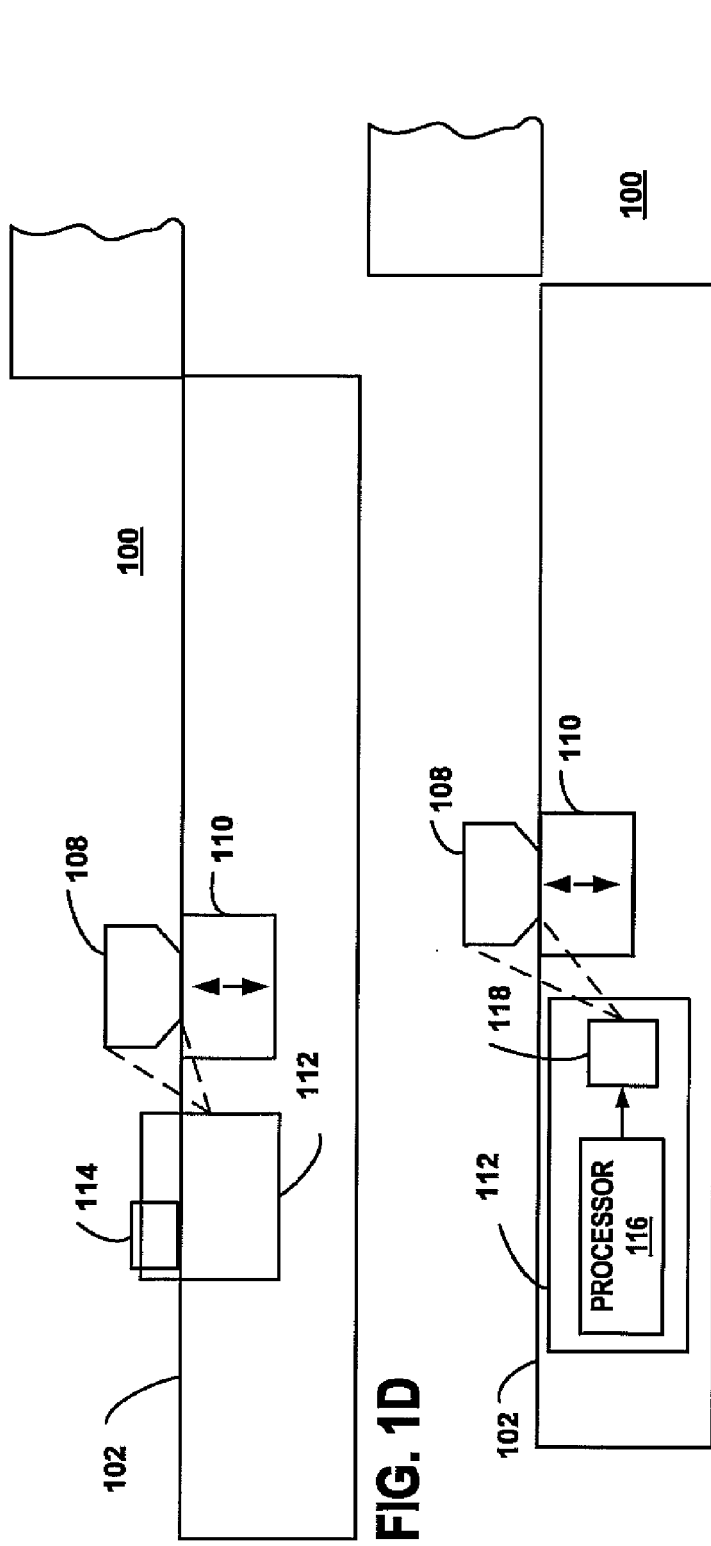
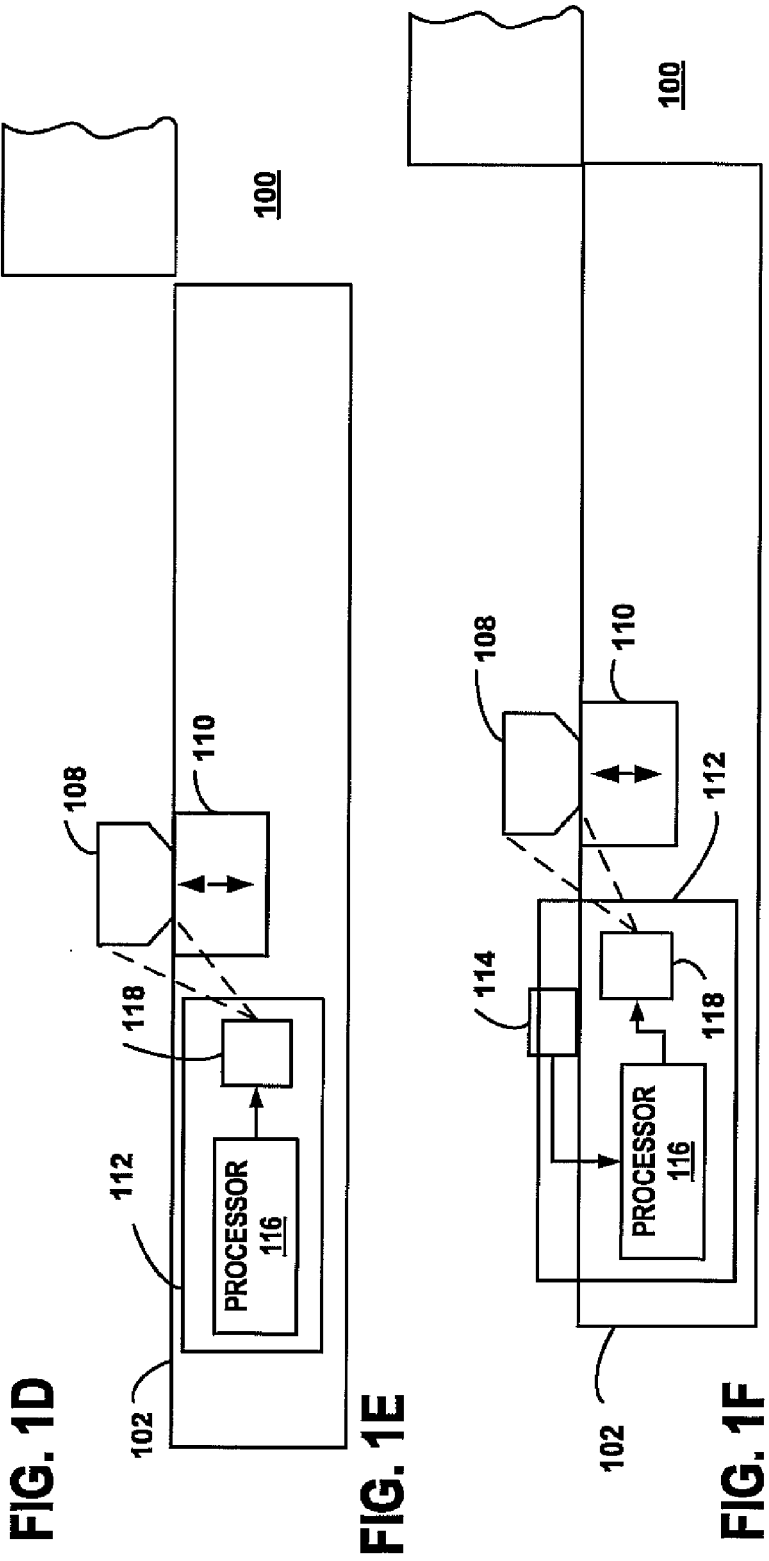

AUDIO DRIVER HOUSING WITH EXPANDABLE CHAMBER FOR PORTABLE COMMUNICATION DEVICES

FIELD

This invention generally relates to portable communication devices and more particularly to portable communication devices with an expandable speaker housing.

BACKGROUND

The size of portable wireless communications devices, such as telephones, continues to shrink, even as more functionality is added. As a result, the designers must increase the performance of components or device subsystems while reducing their size and packaging these components in inconvenient locations. One such critical component is the audio driver. The audio driver is an audio output device, such as speakers, that produces sound waves. The performance of the audio driver often depends on the volume of the air chamber in which the audio driver is positioned. At relatively low audio levels, the size of the air chamber is usually not critical. As the audio driver is driven at relatively higher audio levels, however, the size of the air chamber becomes more critical to the performance of the audio driver. The frequency response of the audio driver may be adversely affected by a speaker chamber that is too small. Conventional designs are limited in that the speaker chamber is selected in accordance with the design and size of the portable communication device. The resulting speaker chamber may be suitable for lower level audio signals but severely limits audio amplitude and efficiency at higher audio situations.

Therefore, there is a need for an expandable speaker chamber for a portable communication device.

SUMMARY

A portable communication device includes an audio driver movable within an audio driver housing which forms an expandable chamber. The portable communication device includes at least two portions that are moveably connected to each other allowing the device to be in at least a closed position and an open position. The audio driver can be maintained in a compressed position when the portable communication device is in an open position. Accordingly, the volume of the chamber is independent of the relative position between the portions forming the portable communication device.

BRIEF DESCRIPTION OF THE DRAWINGS

FIG. 1 is a block diagram of a portable communication device in a closed position.

DETAILED DESCRIPTION

Figure 2A:
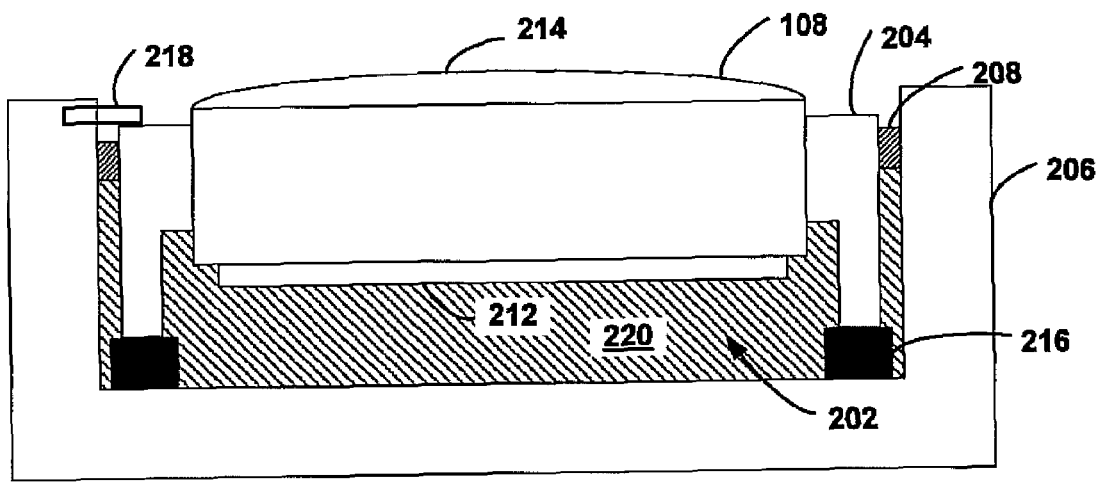
FIG. 2A is a block diagram of a speaker with an expandable chamber with the audio driver in a compressed position.

FIG. 1 is a block diagram of a portable communication device 100 in a closed position. The portable communication device includes at least two portions 102, 104 that are moveably connected to each other. Any of several mechanisms can be used to connect the two portions. The two techniques discussed below in more detail include a lateral slide mechanism, sometimes referred to as a "slide" or "bar" design and a hinged mechanism, sometimes referred to as a "clam shell" or "flip phone" design. The user moves the first portion 102 relative to the second portion 104 to place the device in at least two positions including a closed position and an open position. In the closed position, the portable communication device 100 is smaller and more compact than in the open position. Although some functions and features of the portable communication device 100 may be accessed in the closed position, at least some user interfaces, such as keypads, buttons, displays, and audio devices, are positioned between the portions 102, 104 and are inaccessible. Accordingly, functionality is typically more limited in the closed position than in the open position.

Audio devices may include an input audio device such as a microphone and an output audio device, such as a speaker 106. As discussed herein, a speaker 106 includes an audio driver 108 and an audio driver housing 110 that forms an enclosure where the characteristics and performance of the speaker 106 and/or audio driver 108 at least partially depend on a volume of the enclosure. Many audio driver designs include a diaphragm, such as a paper or plastic cone, a wire voice coil, and a magnet. Electrical signals flowing through the voice coil results in movement of the diaphragm to produce sound waves. The air within the enclosure behind the audio driver 108 provides an air spring. As is well known, the characteristics of the driver dictate the size of the enclosure. If the enclosure is smaller than the optimum size, the maximum audio output power is reduced. In addition, the electrical power needed to produce the same audio output power for a speaker with an enclosure that is smaller than the optimum size increases. Accordingly, the efficiency of a speaker with an enclosure that is too small is less than the efficiency of a speaker with an enclosure having the optimum size.

The audio driver 108 and the audio driver housing 110 form an expandable chamber within the portable communication device 100 to improve efficiency during high audio amplitude conditions while maintaining a compact profile during low audio amplitude conditions. As discussed below, the enclosure formed by the audio driver 108 and audio driver housing 110 is a sealed enclosure for the example discussed herein. Other semi-sealed designs, such as ported enclosures and passive enclosures may be used in some circumstances. An audio driver position controller 112 at least partially controls the position of the audio driver 108 within the audio driver housing 110 to place and/or maintain the audio driver 108 in least a compressed position and an expanded position independent of the relative position of the first device portion 102 to the second device portion 104. FIG. 1A shows the audio driver in the compressed position while the communication device 100 is in a closed position.

FIG. 1B is a block diagram of the portable communication device in an open position with the audio driver 108 in the compressed position and FIG. 1C is a block diagram of the portable communication device in the open position with the audio driver 108 in the expanded position. As discussed below, the audio driver position controller 112 includes a tension device and a securing mechanism in one example. The tension device is configured to push the audio driver to the expanded position and the securing mechanism is configured to maintain the audio driver in the compressed position until the securing mechanism is placed in a release position to allow the tension device to place the audio driver 108 in the expanded position.

FIG. 1D is a block diagram of the portable communication device 100 where the audio driver position controller 112 includes a manual control 114. The audio driver 108 remains in the compressed position until the user activates the manual control 114. An example of a manual control 114 includes a spring and latch mechanism where a spring exerts a force to push the audio driver 108 into the expanded position and a latch maintains the audio driver 108 in the compressed position until activated by the user. The user places the audio driver 108 in the compressed position by applying a force opposite the force of the spring until the latch is engaged to hold the audio driver 108 in the compressed position. The latch may be connected to a button or other mechanical device that is directly activated by the user.

FIG. 1E is a block diagram of the portable communication device 100 where the audio driver position controller 112 includes a processor 116 and an electrically controlled position mechanism 118. The electrically controlled position mechanism 118 is at least partially controlled by electrical signals that are initiated by the processor 116. An example of an audio driver position controller 112 having a processor and an electrically controlled position mechanism 118 includes a spring and an electrically controlled actuator latch. The spring exerts a force to push the audio driver 108 into the expanded position and an electrically controlled actuator latch maintains the audio driver 108 in the compressed position until the processor generates a control signal to activate the actuator 118. The user places the audio driver 108 in the compressed position by applying a force opposite the force of the spring until the latch is engaged to hold the audio driver 108 in the compressed position. Accordingly, for such an example, the position of the audio driver is at least partially controlled by manual manipulation by the user. In other examples, the electrically controlled position mechanism 118 is fully controllable by electrical signals. One such example includes a motorized mechanism that extends the audio driver to the extended position and retracts the audio driver to the compressed position in accordance with electrical control signals.

The processor 116 may evaluate any number of signals, states, or parameters to determine when the audio driver should be placed in the expanded position. Although the factors evaluated by the processor 116 may be based on data unrelated to user input, user input is also evaluated in some circumstances. FIG. 1F is a block diagram of the portable communication device 100 where the audio driver position controller 112 includes a processor 116, an electrically controlled position mechanism 118 and a manual control 114. The manual control 114 may include a button, keypad, switch, or other electromechanical device that allows user input to be detected by the processor. Accordingly, the audio driver position mechanism 112 may include any combination of electromechanical devices, manually manipulated mechanisms, electrically controlled devices, and sensors.

An example where the processor 116 determines to place the audio driver 108 in the expanded position and the data evaluated by the processor 116 does not include user input information includes a situation where the processor 116 detects that the portable communication device 100 is in an open position and in a high audio level state. The high audio level state may include a state where the audio driver 108 is used for generating a ringer. Other examples of a high audio level states include situations where the portable communication device 100 is being used in a push to talk (PTT) communication, where the audio driver is used for playing music, and where the audio driver is used as a speaker phone. Accordingly, examples of high audio states include a speaker phone state, a PTT state, a music state, and a ringer state. Although these high audio states may be entered without user input, in most situations, the user will enter information or provide an indication invoking the portable communication device to enter a particular mode or to perform a function that dictates placing the audio driver in the expanded position. For example, if the user depresses a button to place the portable communication device in speaker phone mode, the processor 116 detects the input, determines whether the device 100 is in the open position, and places the audio driver 108 in the expanded position by sending the appropriate control signal to the electrically controlled position mechanism 118 if the appropriate criteria are met.

Figure 2B:
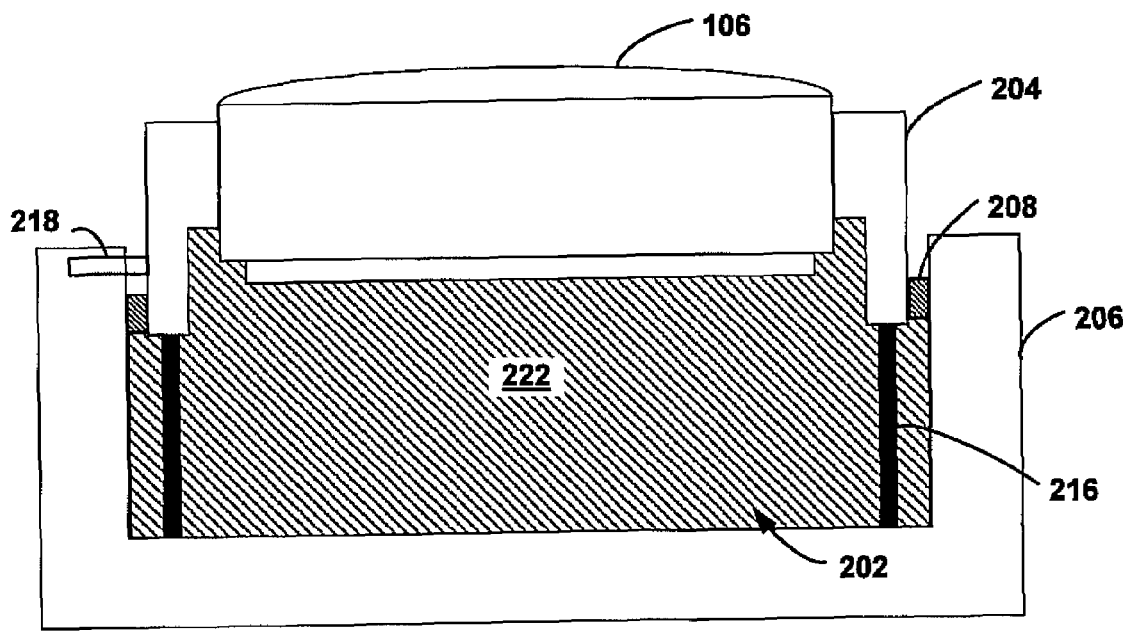
FIG. 2B is a block diagram of the speaker with the audio driver in an expanded position.

FIG. 2A is a block diagram of a speaker 106 with an expandable chamber 202 with the audio driver 108 in a compressed position and FIG. 2B is a block diagram of the speaker 106 with the audio driver in an expanded position. FIG. 2A and FIG. 2B provide an example of forming a speaker 106 with an expandable chamber 202. Other implementations are possible. The audio driver 108 is connected to, or includes, an upper housing portion 204 that moves with the audio driver relative to a lower housing portion 206. A gasket 208 maintains an airtight seal between the upper housing portion 204 and the lower housing portion 206. A chamber 210 is formed between the interior side 212 of the audio driver 108 and the lower housing portion 206 and is sealed by the gasket. Accordingly, the chamber is sealed from ambient air adjacent to an exterior side 214 of the audio driver 108. In some situations, the enclosure formed by the housing and the audio driver may be ported or may include a passive radiator, and therefore, may not be completely isolated from the exterior of the speaker 106. A tension device 216, such as a spring or compressible pad, for example, places a force on the audio driver 108 to push the audio driver to the expanded position. A securing mechanism 218 maintains the audio driver 108 in the compressed position until activated. When activated, the securing mechanism 218 releases the upper housing portion 204 allowing the tension device 216 to push the audio driver 108 to the expanded position as shown in FIG. 2B. In the compressed position, the chamber 202 has a compressed volume 220. In the expanded position the chamber 202 has an expanded volume 222 that is greater than the compressed volume.

Figure 3A:
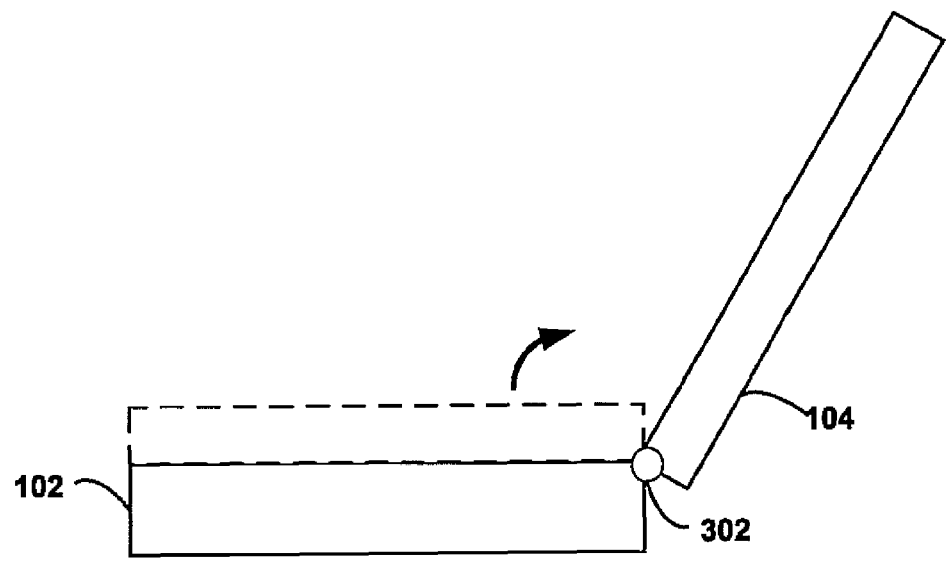
FIG. 3A is a block diagram of a portable communication device having a hinge connecting the first portion to the second portion.

FIG. 3A is a block diagram of a portable communication device 300 having a hinge 302 connecting the first portion 102 to the second portion 104. As discussed above, configurations such as these are sometimes referred to as "clam shell" or "flip phone" designs. A dashed box shown in FIG. 3A represents the second portion 104 when the portable communication device is in the closed position. The second portion 104 is rotated away from the first portion 102 to place the portable communication device 100 in the open position. In most situations, the angle between the first portion 102 and the second portion 104 is less than 180 degrees when the portable communication device is in the open position although other angles may be used.

Figure 3B:
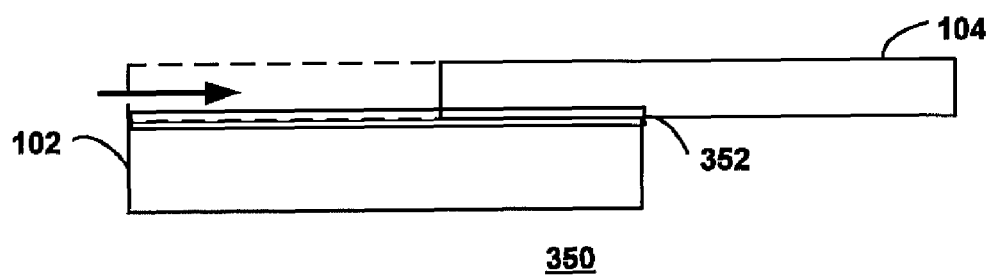
FIG. 3B is a block diagram of a portable communication device having a sliding mechanism connecting the first portion to the second portion.

FIG. 3B is a block diagram of a portable communication device 350 having a sliding mechanism 352 connecting the first portion 102 to the second portion 104. As discussed above, configurations such as these are sometimes referred to as "bar phones" or "slider" designs. A dashed box shown in FIG. 3B represents the second portion 104 when the portable communication device is in the closed position. To place the portable communication device 100 in the open position, the second portion 104 is moved relative to the first portion 102 by sliding, by rotating within the plane of the first and second portions or by a combination of sliding and rotating. In most situations, the angle between the first portion 102 and the second portion 104 is 180 degrees when the portable communication device is in the open position.

Figure 4:
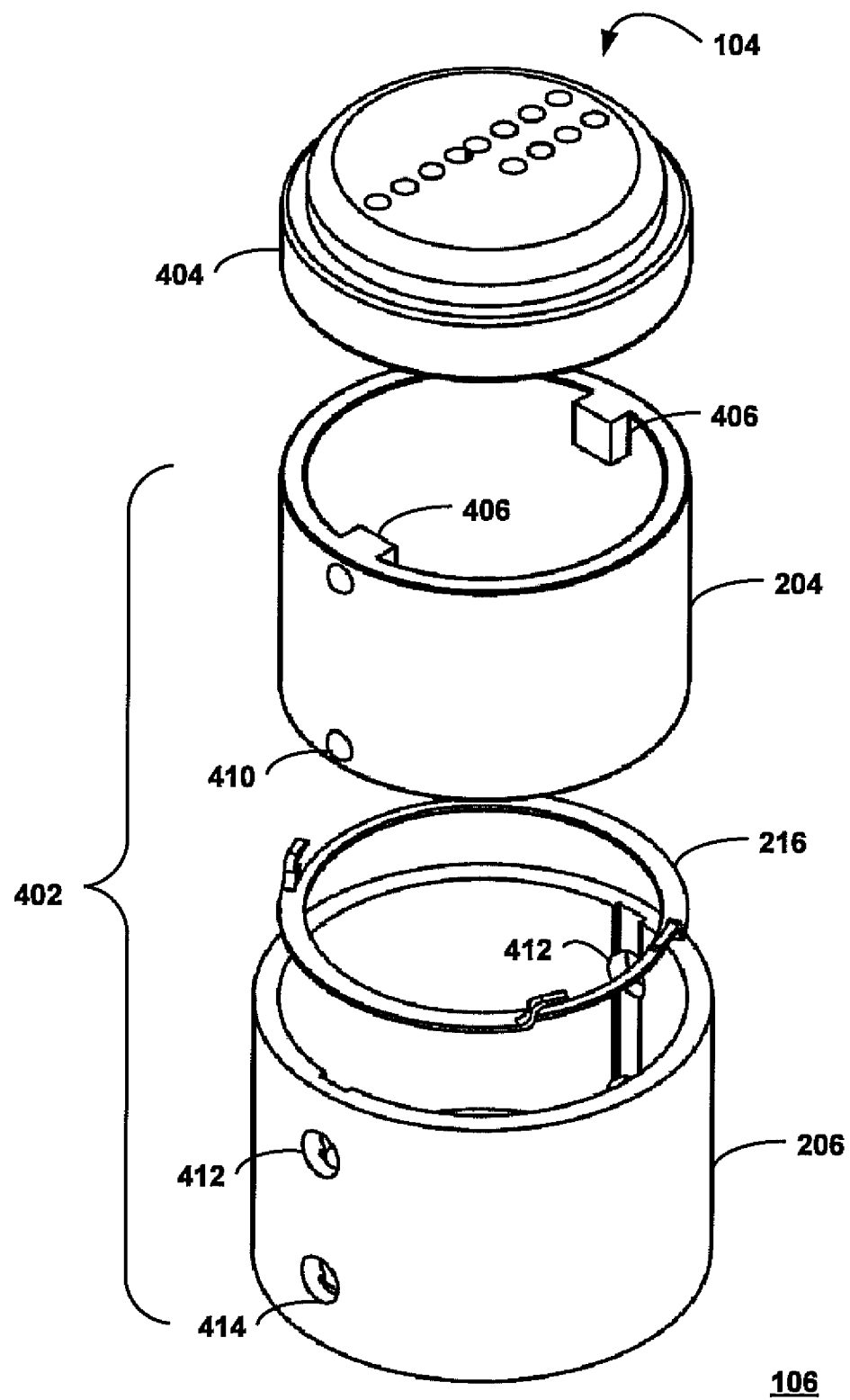
FIG. 4 is an illustration of an expanded perspective view of an example of the speaker with expandable chamber where the securing mechanism includes a ball bearing latch system.

FIG. 4 is an illustration of an expanded perspective view of an example of the speaker 106 with expandable chamber 202 where the securing mechanism 218 includes a ball bearing latch system 402. For the example of FIG. 4, the audio driver is enclosed in a speaker module 404. The speaker module 404 is secured to the upper housing portion 204.

The upper housing portion 204 slides within the lower housing portion 206 and includes a spring loaded ball bearing assembly 406 that engages a ball bearing engagement mechanism 408 of the lower housing portion 206. The spring loaded ball bearing assembly 406 and the ball bearing engagement mechanism 408 for the ball bearing latch system 402. For the example, the upper housing portion 204 may be secured within two positions relative to the lower housing portion 206. In the extended position, a lower ball bearing 410 engages an upper opening 412 in the lower housing portion to secure the housing portions in the extended position. In the compressed position, the lower ball bearing 410 engages a lower opening 414 to maintain the housing portions in the compressed position. In some circumstances, the openings 412, 414 may be recesses or other features.

The position of the speaker 106 is changed by the user by depressing the speaker module 404. By "clicking" the upper housing portion 204, the upper housing portion 204 can be released from the lower housing portion 206 allowing the spring 216 to push the upper housing portion 204 to the extended position where the ball bearing latch system 402 is again engaged. The user places the speaker 106 in the compressed position by depressing the speaker module 404 to compress the spring 216 and move the upper housing portion down into the lower housing position 206 until the ball bearing latch system 402 engages.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A portable communication device comprising:
   a first portion; and
   a second portion movably connected to the first portion to allow the second portion to be positioned relative to the first portion in at least two positions comprising a closed position and an open position;
   the first portion comprising:
      an audio driver housing;
      an audio driver movable within the audio driver housing to form an expandable audio driver chamber having at least a compressed chamber volume when the audio driver is in a compressed position and an expanded chamber volume when the audio driver is in an expanded position, the expanded chamber volume greater than the compressed chamber volume;
      an audio driver position controller configured to position the audio driver in one of at least the compressed position and the expanded position while the first portion and the second portion are in the open position.

2. The portable communication device of claim 1, wherein the audio driver position controller comprises:
   a tension device configured to apply a force to place the audio driver in the expanded position;
   a securing mechanism configured to maintain the audio driver in the compressed position until the securing mechanism is placed in a release position to allow the tension device to place the speaker in the expanded position.

3. The portable communication device of claim 2, wherein the tension device is a spring and the securing mechanism is a latch.

4. The portable communication device of claim 1, wherein the audio driver position controller is controllable by manual manipulation by a user.

5. The portable communication device of claim 1, wherein the portable communication device further comprises a processor and where the audio driver position controller is controllable by an electrical control signal generated by the processor.

6. The portable communication device of claim 5, wherein the processor is configured to generate the control signal to place the audio driver in the expanded position based on an operational state of the portable communication device.

7. The portable communication device of claim 6, wherein the operational state is one of a speaker mode state, push to talk state, or music broadcast state.

8. The portable communication device of claim 1, further comprising a hinge connecting the first portion to the second portion allowing the first portion to rotate relative to the second portion from the closed position where the first portion is parallel to the second portion to the open position where the first portion is positioned at an angle greater than zero degrees to the second plane.

9. The portable communication device of claim 8, wherein the audio driver position controller is configured to maintain the audio driver in the compressed position when the device is in the open position until released by the audio driver position controller to allow the audio driver to move to the expanded position.

10. The portable communication device of claim 1, wherein the first portion is connected to the second portion through a sliding mechanism allowing the second portion to slide relative to the first portion from the closed position to the open position.

11. The portable communication device of claim 10, wherein the audio driver position controller is configured to maintain the audio driver in the compressed position when the device is in the open position until released by the audio driver position controller to allow the audio driver to move to the expanded position.

12. A portable communication device comprising:
   a first portion; and
   a second portion movably connected to the first portion to allow the second portion to be positioned relative to the first portion in at least two positions comprising a closed position and an open position;

the first portion comprising:
an audio driver housing comprising an upper housing portion and a lower housing portion movable relative to the upper housing portion and an audio driver secured to the upper housing portion to form an expandable audio driver chamber having at least a compressed chamber volume when the audio driver is in a compressed position and an expanded chamber volume when the audio driver is in an expanded position, the expanded chamber volume greater than the compressed chamber volume; and
an audio driver position controller comprising:
a tension device configured to apply a force to place the audio driver in the expanded position; and
a securing mechanism configured to maintain, while the device is in the open position, the audio driver in the compressed position until the securing mechanism is placed in a release position to allow the tension device to place the speaker in the expanded position.

13. The portable communication device of claim 12, wherein the tension device is a spring and the securing mechanism is a latch.

14. The portable communication device of claim 12, wherein the audio driver position controller is controllable by manual manipulation by a user.

15. The portable communication device of claim 12, wherein the portable communication device further comprises a processor and where the audio driver position controller is controllable by an electrical control signal generated by the processor.

16. The portable communication device of claim 15, wherein the processor is configured to generate the control signal to place the audio driver in the expanded position based on an operational state of the portable communication device.

17. A portable communication device having a flip-phone configuration, the device comprising:
a first portion; and
a second portion rotateably connected to the first portion by a hinge to allow the second portion to rotate relative to the first portion from a closed position where the first portion is parallel to the second portion to an open position where the second portion is positioned at an angle greater than zero degrees to the first portion,
the first portion comprising:
an audio driver housing comprising an upper housing portion and a lower housing portion movable relative to the upper housing portion and an audio driver secured to the upper housing portion to form an expandable audio driver chamber having at least a compressed chamber volume when the audio driver is in a compressed position and an expanded chamber volume when the audio driver is in an expanded position, the expanded chamber volume greater than the compressed chamber volume, the audio housing covered by the second portion when the wireless communication device is in the closed position; and
an audio driver position controller comprising:
a tension device configured to apply a force to place the audio driver in the expanded position; and
a securing mechanism configured to maintain, while the device is in the open position, the audio driver in the compressed position until the securing mechanism is placed in a release position to allow the tension device to place the speaker in the expanded position.

18. The portable communication device of claim 17, wherein the audio driver position controller is controllable by manual manipulation by a user.

19. The portable communication device of claim 17, wherein the portable communication device further comprises a processor and where the audio driver position controller is controllable by an electrical control signal generated by the processor.

* * * * *